(12) United States Patent
Liu et al.

(10) Patent No.: US 9,768,958 B2
(45) Date of Patent: Sep. 19, 2017

(54) VISIBLE-LIGHT COMMUNICATION-BASED ENCRYPTION, DECRYPTION AND ENCRYPTION/DECRYPTION METHOD AND SYSTEM

(71) Applicant: KUANG-CHI INNOVATIVE TECHNOLOGY LTD., Shenzhen (CN)

(72) Inventors: Ruopeng Liu, Shenzhen (CN); Lin Luan, Shenzhen (CN); Guangjin Xiao, Shenzhen (CN)

(73) Assignee: KUANG-CHI INNOVATIVE TECHNOLOGY LTD., Shenzhen (CN)

( * ) Notice: Subject to any disclaimer, the term of this patent is extended or adjusted under 35 U.S.C. 154(b) by 49 days.

(21) Appl. No.: 14/399,514

(22) PCT Filed: May 7, 2013

(86) PCT No.: PCT/CN2013/075283
§ 371 (c)(1),
(2) Date: Nov. 7, 2014

(87) PCT Pub. No.: WO2013/166958
PCT Pub. Date: Nov. 14, 2013

(65) Prior Publication Data
US 2015/0071439 A1    Mar. 12, 2015

(30) Foreign Application Priority Data

May 7, 2012  (CN) .......................... 2012 1 0137310
May 7, 2012  (CN) .......................... 2012 1 0137316
(Continued)

(51) Int. Cl.
*H04K 1/02* (2006.01)
*H04L 9/08* (2006.01)
(Continued)

(52) U.S. Cl.
CPC ............. *H04L 9/0869* (2013.01); *G09C 5/00* (2013.01); *H04B 10/116* (2013.01); *H04K 1/02* (2013.01);
(Continued)

(58) Field of Classification Search
CPC .... H04B 10/116; H04K 1/02; H04L 2209/24; H04L 9/06; H04L 9/0869; H04L 9/12
See application file for complete search history.

(56) References Cited

U.S. PATENT DOCUMENTS 7,512,237 B1 *  3/2009  Schantz ................... H04L 9/12
                                                    359/107
2002/0025041 A1 *  2/2002  Tomita ................. H04L 9/0662
                                                    380/256
(Continued)

FOREIGN PATENT DOCUMENTS

CN      1159108 A    9/1997
CN      1593033 A    3/2005
(Continued)

Primary Examiner — Gary Gracia
(74) Attorney, Agent, or Firm — Perkins Coie LLP

(57) ABSTRACT

Embodiments of the present invention provide a method and system of encryption, decryption, and encryption and decryption based on visible light communication. A transmit end performs a logical operation on an original data signal and a pseudocode signal varying with a unit interval to obtain a scrambling code signal, and sends the scrambling code signal in a form of a visible light signal. A receive end receives the visible light signal sent by the transmit end, and converts the visible light signal into a digital signal; and decodes the digital signal and a pseudocode signal varying with a unit interval, so as to obtain the original data signal. The visible light signal transmitted between the transmit end and the receive end is not original data, but a scrambling (Continued)

code signal varying with a unit interval, thereby improving security of the photonic Internet of Things.

18 Claims, 6 Drawing Sheets

(30) Foreign Application Priority Data

May 7, 2012 (CN) .......................... 2012 1 0137556
May 7, 2012 (CN) .......................... 2012 1 0137561

(51) Int. Cl.
*H04L 9/06* (2006.01)
*H04B 10/116* (2013.01)
*G09C 5/00* (2006.01)
*H04L 9/12* (2006.01)
*H04K 1/00* (2006.01)

(52) U.S. Cl.
CPC ............... *H04L 9/06* (2013.01); *H04L 9/12* (2013.01); *H04L 2209/24* (2013.01)

(56) References Cited

U.S. PATENT DOCUMENTS

| | | | | |
|---|---|---|---|---|
| 2002/0091463 A1* | 7/2002 | Piazza | ............... | G06F 1/183 700/213 |
| 2006/0273925 A1* | 12/2006 | Schwartz | ............... | G08G 1/087 340/907 |
| 2008/0111503 A1* | 5/2008 | Ess | ............... | H05B 33/0818 315/297 |
| 2009/0251346 A1* | 10/2009 | Kwan | ............... | H03M 3/416 341/143 |
| 2010/0262212 A1* | 10/2010 | Shoham | ............... | A61N 5/0601 607/88 |
| 2010/0266126 A1* | 10/2010 | Kymissis | ............... | F41H 3/02 380/270 |
| 2011/0090099 A1* | 4/2011 | Tsai | ............... | H04B 10/1143 341/100 |
| 2011/0200192 A1* | 8/2011 | Etemad | ............... | H04L 9/0891 380/256 |
| 2011/0316599 A1* | 12/2011 | Kwak | ............... | H03L 7/0814 327/158 |
| 2012/0076301 A1* | 3/2012 | Kanter | ............... | H04K 1/02 380/256 |
| 2012/0221860 A1* | 8/2012 | Hoornaert | ............... | G06F 21/34 713/172 |
| 2012/0256757 A1* | 10/2012 | Kwan | ............... | G08B 5/36 340/691.1 |
| 2013/0089204 A1* | 4/2013 | Kumar | ............... | H04B 10/70 380/256 |
| 2014/0015407 A1* | 1/2014 | Baudru | ............... | H05B 33/0848 315/77 |

FOREIGN PATENT DOCUMENTS

| | | |
|---|---|---|
| CN | 201060495 Y | 5/2008 |
| CN | 101656728 A | 2/2010 |
| CN | 101820331 A | 9/2010 |
| CN | 101969376 A | 2/2011 |
| CN | 102684786 A | 9/2012 |
| CN | 102684869 A | 9/2012 |
| CN | 102710364 A | 10/2012 |
| CN | 102710418 A | 10/2012 |
| WO | 2011103267 A1 | 8/2011 |

* cited by examiner

VISIBLE-LIGHT COMMUNICATION-BASED ENCRYPTION, DECRYPTION AND ENCRYPTION/DECRYPTION METHOD AND SYSTEM

TECHNICAL FIELD

The present invention relates to the field of the photonic Internet of Things technologies, and specifically, to a method and system of encryption, decryption, and encryption and decryption based on visible light communication.

BACKGROUND

A wireless optical communications technology is also called visible light communication, where communication is performed by flashing an LED light source at a high frequency, presence of light indicates 1, and absence of light indicate 0, and a transmission rate can reach a maximum of gigabits per second. In the wireless optical communications technology, data is unlikely to be interfered or captured, and an optical communication device can be easily made and are unlikely to be damaged or demagnetized. Therefore, the wireless optical communications technology can be used to make a wireless optical encryption key. Compared with a microwave technology, wireless optical communication has relatively rich spectrum resources, which is unmatched by common microwave communication and wireless communication; in addition, visible light communication can be applicable to any communications protocol, and is suitable for any environment; in terms of security, compared with conventional magnetic materials, there is no need to worry about a problem of degaussing, or even to worry about that communication content is intercepted; and optical wireless communication equipment features flexible and convenient installation and layout, and low costs, and is applicable to large-scale popularity and application.

The Internet of Things is a network that is based on an information carrier such as the Internet, a conventional telecommunications network, or the like, so that all common physical objects that can be individually addressable can implement interconnection and interworking. The Internet of Things refers to that ubiquitous terminal devices and facilities implements interconnection and interworking by using various wireless or wired long-distance or short-distance communications networks to provide secure, controllable and even personalized management and service functions such as real-time online monitoring, positioning tracing, alarm linkage, scheduling and dispatching, plan management, remote control, security protection, remote maintenance, online upgrade, statistical reporting, decision-making support, and leader desktop, so as to implement integration of "management, control, and operation" of high efficiency, energy saving, security, environmental protection of devices. A conventional Internet of Things generally implements interconnection and interworking by using various wireless or wired communications networks, and uses a conventional communications technology.

In the prior art, there is an Internet of Things technology that implements short-distance communication by means of transmission of visible light in free space, and the Internet of Things using the visible light communications technology is called the photonic Internet of Things. The photonic Internet of Things has functions of a conventional Internet of Things, and performs communication by using visible light in terms of communication mode. Because visible light has high directivity, and cannot penetrate a barrier, and therefore has higher security than wireless transmission, the photonic Internet of Things that uses visible light to implement short-range communication has higher security than an Internet of Things that uses a wireless communication mode.

However, in the current photonic Internet of Things technology, original data is not encrypted, but a signal is modulated directly onto a visible light signal for transmission, or a data source is only simply encrypted, for example, a logical operation is performed on the original data and a scrambling code, while a scrambling code sequence remains unchanged. In this case, there might be a security risk, for example, when a high-speed camera is used for shooting, a light signal with a same strobe might be replicated, and then when an LED transmitter of the same type is used to transmit such type of signal, a receive control end may recognize the replicated signal and consider the replicated signal legal, and can correctly restore the original signal, so as to control a device, for example, enabling an access control system, thereby leading to a security risk.

SUMMARY

A technical problem to be solved by the present invention is to provide a method and system of encryption, decryption, and encryption and decryption based on visible light communication, so as to improve security of the photonic Internet of Things.

To solve the foregoing technical problem, an embodiment of the present invention provides an encryption method based on visible light communication, and the method includes: performing a logical operation on an original data signal and a pseudocode signal varying with a unit interval to obtain a scrambling code signal; and sending the scrambling code signal in a form of a visible light signal.

The present invention further provides an encryption system based on visible light communication, and the encryption system includes: a pseudocode generator, configured to generate and output a pseudocode signal, where the pseudocode signal varies with a unit interval; an encoder, connected to the pseudocode generator and configured to perform a logical operation on an original data signal and the pseudocode signal output by the pseudocode generator, so as to output a scrambling code signal; and a sending unit, connected to the encoder and configured to send the scrambling code signal in a form of a visible light signal.

Preferably, the original data is clock information, and before the encryption method, the following is further included: extracting clock information of a transmit end.

Preferably, before the sending the scrambling code signal in a form of a visible light signal, the encryption method further includes: modulating the scrambling code signal. Preferably, the encryption system further includes: a modulator, connected between the encoder and the sending unit, and configured to modulate the scrambling code signal.

Preferably, a frequency of the original data signal and a frequency of the pseudocode signal are the same or in an integer multiple relationship.

Preferably, a start phase of the original data signal is the same as that of the pseudocode signal.

Preferably, the pseudocode signal is a number, and the logical operation includes addition, subtraction, multiplication, division, logical and, logical or, logical exclusive or, or a combination of the forgoing two or more of the original data signal and the number.

Preferably, the number is: a date varying with time, a prime number varying with time, an odd number varying with time, or an even number varying with time.

The present invention further provides a decryption method based on visible light communication, and the method includes: receiving a visible light signal sent by a transmit end, and converting the visible light signal into a digital signal; and decoding the digital signal and a pseudocode signal varying with a unit interval, so as to obtain an original data signal; where a code pattern and a start phase of the pseudocode signal are the same as those of a pseudocode signal of the transmit end at a same time point.

Preferably, the original data is clock information, and the decryption method further includes: extracting local clock information.

Preferably, before the decryption method, the following are included: designing a preset model, and determining the number of clock cycles occupied by the digital signal per bit.

Preferably, the decryption method further includes: collecting statistics about delay time at the transmit end, and performing probability distribution and characteristic analysis according to the clock cycle; and performing pre-determining on a received signal according to the preset model, the local clock information, and a probability distribution and characteristics analysis result, so as to implement detection on signal synchronization information.

Preferably, before the decoding the digital signal and a pseudocode signal varying with a unit interval, the decryption method further includes: demodulating the digital signal.

Preferably, the decryption method further includes: authenticating the original data signal that is obtained, and if the authentication is successful, controlling an action of a connected functional unit.

Preferably, a frequency of the original data signal and a frequency of the pseudocode signal are the same or in an integer multiple relationship.

Preferably, a start phase of the original data signal is the same as that of the pseudocode signal.

The present invention further provides a decryption system based on visible light communication, and the system includes: a receiving unit, configured to receive a visible light signal sent by a transmit end and convert the visible light signal into a digital signal; a pseudocode generator, configured to generate and output a pseudocode signal varying with a unit interval; and a decoder, connected to the receiving unit and the pseudocode generator, and configured to decode the digital signal and the pseudocode signal, so as to output an original data signal.

Preferably, the system further includes: a demodulator, connected between the receiving unit and the decoder, and configured to demodulate the digital signal.

Preferably, the pseudocode generator and a pseudocode generator at a transmit end have a same structure.

Preferably, the pseudocode generator and a pseudocode generator at a transmit end have a same working state.

Preferably, a frequency of the pseudocode generator and a frequency of a pseudocode generator at a transmit end are the same or in an integer multiple relationship.

The present invention further provides an encryption and decryption method based on visible light communication, and the method includes: performing, by a transmit end, a logical operation on an original data signal and a first pseudocode signal varying with a unit interval to obtain a scrambling code signal, and sending the scrambling code signal in a form of a visible light signal; and receiving, by a receive end, the visible light signal, converting the visible light signal into a digital signal, and decoding the digital signal and a second pseudocode signal varying with a unit interval, so as to obtain the original data signal; wherein a code pattern, and start and end phases of the second pseudocode signal are the same as those of the first pseudocode signal.

Preferably, before the sending the scrambling code signal in a form of a visible light signal, the encryption and decryption method further includes: modulating the scrambling code signal.

Preferably, before the decoding the digital signal and the second pseudocode signal, the encryption and decryption method further includes: demodulating the digital signal.

Preferably, a frequency of the original data signal and a frequency of the first pseudocode signal are the same or in an integer multiple relationship; and a start phase of the original data signal is the same as that of the first pseudocode signal.

Preferably, the encryption and decryption method further includes: authenticating, by the receive end, the original data signal that is obtained, and if the authentication is successful, controlling an action of a functional unit connected to the receive end.

Preferably, the first pseudocode signal and the second pseudocode signal are numbers, the logical operation comprises addition, subtraction, multiplication, division, logical and, logical or, logical exclusive or, or a combination of the forgoing two or more of the original data signal and the first pseudocode signal, and the decoding comprises addition, subtraction, multiplication, division, logical and, logical or, logical exclusive or, or a combination of the forgoing two or more of the digital signal and the second pseudocode signal.

Preferably, the number is: a date varying with time, a prime number varying with time, an odd number varying with time, or an even number varying with time.

The present invention further provides an encryption and decryption system based on visible light communication, and the system includes: a transmit end and a receive end. The transmit end includes: a first pseudocode generator, configured to generate and output a first pseudocode signal, where the pseudocode signal varies with a unit interval; an encoder, connected to the first pseudocode generator and configured to perform a logical operation on an original data signal and a pseudocode signal output by a pseudocode generator, so as to output a scrambling code signal; and a sending unit, connected to the encoder and configured to send the scrambling code signal in a form of a visible light signal; and the receive end includes: a receiving unit, configured to receive the visible light signal and convert the visible light signal into a digital signal; a second pseudocode generator, configured to generate and output a second pseudocode signal, where a code pattern, and start and end phases of the second pseudocode signal are the same as those of the first pseudocode signal; and a decoder, connected to the receiving unit and the second pseudocode generator, and configured to decode the digital signal and the pseudocode signal, so as to output an original data signal.

Preferably, the transmit end further includes: a modulator, connected between the encoder and the sending unit, and configured to modulate the scrambling code signal; and the receive end further comprises: a demodulator, connected between the receiving unit and the decoder, and configured to demodulate the digital signal.

Preferably, the first pseudocode generator and the second pseudocode generator have a same structure.

Preferably, the first pseudocode generator and the second pseudocode generator have a same working state, and a frequency of the first pseudocode generator and a frequency of the second pseudocode generator are the same or in an integer multiple relationship.

Compared with the prior art, the foregoing technical solutions have the following advantages: in the encryption and decryption method that is adopted, a visible light signal transmitted between a transmit end and a receive end is not original data signal, but an encrypted scrambling code signal, and the scrambling code signal varies with a unit interval and is unlikely to be cracked, thereby improving security of the photonic Internet of Things.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
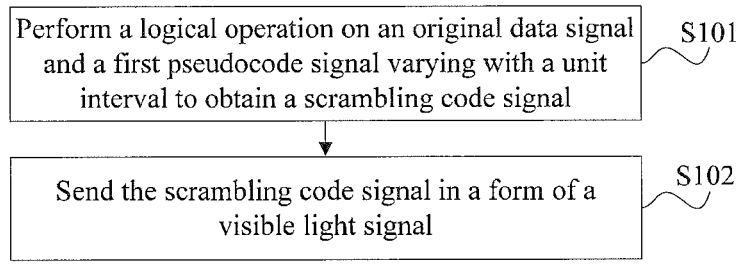
FIG. 1 is a flowchart of an encryption method based on visible light communication according to Embodiment 1.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Firstly, in order to make persons skilled in the art better understand the present invention, the following briefly describes technical solutions of the present invention.

The present invention provides a method of encrypting original data by using a pseudocode sequence, and a method of decrypting encrypted data to restore the original data in the photonic Internet of Things. The pseudocode sequence used in the foregoing method changes in state constantly over time according to principles of a state machine, and a replicated signal cannot be recognized by a receive end in other time, thereby improving security of a system. In an operation, a logical operation is first performed on original data and the pseudocode sequence, the original data and the pseudocode sequence are then sent to a visible light transmitter after being modulated, and pseudocode sequences of pseudocode generators at a transmit end and at the receive end change constantly over time according to principles of a state machine. In this case, even though transmitted visible light is shot by a high-speed camera and is replicated, because a pseudocode sequence at the receive end at another time has changed over time, the replicated signal can no longer be recognized by the receive end, and therefore devices at the receive end of the photonic Internet of Things, such as an access control system, a two-dimensional code, and the like, cannot be controlled, thereby effectively improving security of the photonic Internet of Things.

The present invention, based on transmission characteristics of a stroboscopic signal of visible light, provides a comprehensive design solution with a signal encryption, decryption, encryption and decryption method and apparatus, and the present invention has the following characteristics:

1. In the present invention, encryption aims at visible light, that is, a stroboscopic signal of visible light is encrypted in a free-space environment.

2. In one implementation, a logical operation is performed on clock information and a scrambling code signal on visible light, where the clock information is from a clock module or from clock information on a network, so as to provide a scrambling signal varying with a unit interval. Different from conventional static encryption or dynamic encryption modes, an encryption mode in the present invention is a combination of clock information and a dynamic encryption algorithm. A logic operation is performed according to clock information and a dynamic scrambling algorithm, a scrambled signal (for example, the foregoing described pseudocode signal varying with the unit interval) is then obtained, and then an original data signal (for example, an ID signal, which is data for indicating user identity) is scrambled, achieving dynamic encryption.

3. An important characteristic of dynamic encryption is that a scrambling code signal (for example, ID) transmitted in each unit interval or at each time is unique and changes dynamically, thereby improving security.

4. Some issues that may be encountered in an actual decryption process are as follow:

A: Visible light transmission is unidirectional, and a transmit end cannot receive a feedback that a receive end implements correct or incorrect receiving.

B: A stroboscopic signal may lose synchronization information in an actual transmission process, and a stroboscopic signal transmits information by controlling turning-on and -off of an LED light. However, in an actual process, because of a physical characteristic of the LED light, the LED light is on and off in different time points, and duration of the LED light turning on may affect delay time of the LED light turning off subsequently, and further affect delay time of the LED light turning on. An error of turning-on and -off of an LED light is random, and since an error of turning-on and -off of an LED light is random after synchronization of signals of a clock, therefore a receive end may fail to detect a synchronization signal, causing a failure of detection and failure of system decryption.

For example, in wireless mobile communications, a main problem of an air interface is a multipath effect and a Doppler frequency shift. In a multipath effect, an impact of a near end on a mobile terminal is fast fading, and that of a fast end on a mobile terminal is shadow fading. Therefore, many core technologies of wireless communications, such as intertwine, Rake receiver, all aim at solving this problem. For a stroboscopic signal emitted in free space, it is found by studying a channel model of an air interface of the stroboscopic signal, that a main problem is that an LED light has a physical characteristic of random delay of turning-on and -off, causing a failure of transmitting synchronized signals. In a traditional coding mode, such as PPM, PWM, and keying modulation, demodulation is performed based on an important prerequisite that a processor on a receive end performs sampling, detects a high-low level, and make a determining of 0 or 1 in a synchronization cycle time point, so as to obtain digital information. If synchronization information fails to be transmitted, this problem may not be solved according to a traditional mode. Therefore, the present invention designs a unique coding mode, and an error correction mode, and designs various means such as determining a preset model, to resolve this problem. The foregoing addition of a clock is also one of important solutions, which not only addresses a synchronization problem, but also is combined with encryption.

A solution according to one embodiment of the present invention is: if a transmitted signal does not carry synchronization information, the signal cannot be decrypted or pass through a dynamic encryption signal. However, according to the present invention, a clock signal may be extracted at a transmit end, and suffers from a logical operation with a dynamic encryption algorithm, and an original data signal (for example ID information) is scrambled. At a receive end, a logical operation may be performed on clock information that is obtained from a clock module of the receive end or a network to which the receive end belongs, and a dynamic encryption algorithm, and a logical operation is performed on the information and a received signal, so as to complete decryption. Specifically:

A: Respectively extract an absolute clock signal of each.

B: Since the clock signal of each belongs to two ends of a terminal and a network, clock accuracy is inconsistent, and because transmission is unidirectional, communication lose may not be feed back, a preset model is designed, and a determining is made according to a preset value, so as to solve a problem of a synchronization failure caused due to clock accuracy inconsistency.

C: A baseband signal controls turning-on and -off of an LED light by means of LED drive, control time points are random since delay time of turning-on and -off of an LED light is inconsistent, causing inconsistency in gaps between stroboscopic signals output by a transmit end, and synchronization information may be lost even through an correct clock signal is added to the baseband signal to control turning-on and -off of an LED light. Therefore, statistics may be collected, and a probability distribution and characteristic analysis is performed by studying LED delay time, so as to establish a preset model, and by performing predetermining on a preset value, determining is performed on synchronization of a signal, so as to extract synchronization information, and detection is performed on a stroboscopic signal by means of time synchronization, so as to implement system encryption and decryption.

D: Original data signals (such as an ID signal) are actually not all 0 or 1, stroboscopic signal synchronization characteristic after an original data signal is multiplied with a clock signal is more unobvious. Therefore, upon making a preset model, averaging is performed, by considering that an actual original data signal (such as an ID signal) may randomly appear 0 or 1, so as to perform correction of the preset value.

E: After a stroboscopic signal is detected correctly, a receive end may synchronize signal time according to a received stroboscopic signal for recording, so as to compare local time information of the receive end, estimate an error between clocks of a transmit end and the receive end, and correct a preset value of a preset model. According to this manner, the present invention may provide precise clock synchronization between the transmit end and the receive end, a first pseudocode signal varying with a unit interval and generated at the transmit end is configured to encrypt an original data signal, and a corresponding second pseudocode generated at the receive end is configured to decrypt a received visible light signal.

The following describes some exemplary embodiments of the present invention in detail, so as to provide a more profound understanding of the present invention.

Embodiment 1

Referring to FIG. 1, FIG. 1 is a flowchart of an encryption method based on visible light communication according to Embodiment 1, and the encryption method may include:

S101: A transmit end performs a logical operation on an original data signal and a pseudocode signal varying with a unit interval to obtain a scrambling code signal.

The original data signal may be information to be sent, such as a control signal, two-dimensional code information content, user identity (ID) information, and the like, and may be a digital sequence signal. The pseudocode signal used in the present invention may be a digital sequence varying with a unit interval, where the unit interval may be set according to needs, for example, every day, every hour, every minute, or the like. For example, the pseudocode signal is a date varying with time, such as 20120424, 20120425, 20120436; a prime number varying with time, such as four prime numbers increasing in ascending order; an odd number varying with time; or an even number varying with time; or may be another preset number. For ease of reference and distinguishing, the scrambling code signal in step S101 is called a first scrambling code signal.

A frequency of the original data signal and a frequency of the first pseudocode signal are the same or in an integer multiple relationship; and a start phase of the original data signal is the same as that of the first pseudocode signal. The logical operation performed on the original data signal and the first pseudocode signal may be an arithmetical operation, for example addition, subtraction, multiplication, division, or the like, or may be another logical operation, for example logical and, logical or, logical exclusive or, or the like, or may be a combination of two or more of the foregoing operations.

For example, original data may be a control signal or two-dimensional code information content, and a digital sequence signal of the original data remains unchanged constantly, for example the original data signal is 11000101011110000110 all the time. In a T1 unit interval, assuming that the first pseudocode signal is 11101001110100110100, a logical operation, for example an "exclusive or" process, on the original data signal and the first pseudocode signal is shown in table 1:

TABLE 1

| Logical operation process in a T1 unit interval | | | | | | | | | | | | | | | | | | | | |
|---|---|---|---|---|---|---|---|---|---|---|---|---|---|---|---|---|---|---|---|---|
| Original data signal | 1 | 1 | 0 | 0 | 0 | 1 | 0 | 1 | 0 | 1 | 1 | 1 | 1 | 0 | 0 | 0 | 0 | 1 | 1 | 0 |
| First pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 |
| Scrambling code signal | 0 | 0 | 1 | 0 | 1 | 1 | 0 | 0 | 1 | 0 | 1 | 0 | 1 | 0 | 1 | 1 | 1 | 0 | 0 | 1 | 0 |

It can be seen from table 1 that, the scrambling code signal output after the logical operation is 00101100101011110010, and is different from the original data signal, thereby playing a role of encrypting the original data.

After a preset interval, assuming that the interval is T2 at that time, because the first pseudocode signal varies with a unit interval, therefore in the T2 interval, assuming that the first pseudocode signal is changed to 10001101010010101010, and the original data signal remains unchanged constantly, then a logical operation, for example an "exclusive or" process, on the original data signal and the first pseudocode signal is shown in table 2:

TABLE 2

| Logical operation process in a T2 unit interval | | | | | | | | | | | | | | | | | | | | |
|---|---|---|---|---|---|---|---|---|---|---|---|---|---|---|---|---|---|---|---|---|
| Original data signal | 1 | 1 | 0 | 0 | 0 | 1 | 0 | 1 | 0 | 1 | 1 | 1 | 1 | 0 | 0 | 0 | 0 | 1 | 1 | 0 |
| First pseudocode signal | 1 | 0 | 0 | 0 | 1 | 1 | 0 | 1 | 0 | 1 | 0 | 0 | 1 | 0 | 1 | 0 | 1 | 0 | 1 | 1 | 0 |
| Scrambling code signal | 0 | 1 | 0 | 0 | 1 | 0 | 0 | 0 | 0 | 0 | 1 | 1 | 0 | 0 | 1 | 0 | 1 | 0 | 0 | 0 | 0 |

It can be seen from table 2 that, the scrambling code signal output after the logical operation in the T2 interval is 01001000011001010000, is also different from the original data signal, and is also different from the scrambling code signal in the T1 interval.

In addition, the encryption method further includes:

S102: The transmit end sends the scrambling code signal in a form of a visible light signal. For example, the transmit end sends a modulated signal by means of LED light in a flashing manner. With regard to the foregoing scrambling code signal 00101100101011110010, the LED light flashes at a high frequency, and presence of light may indicate 1, and absence of light may indicate 0, or vice verse, thereby effectively implementing visible light communication.

Figure 2:
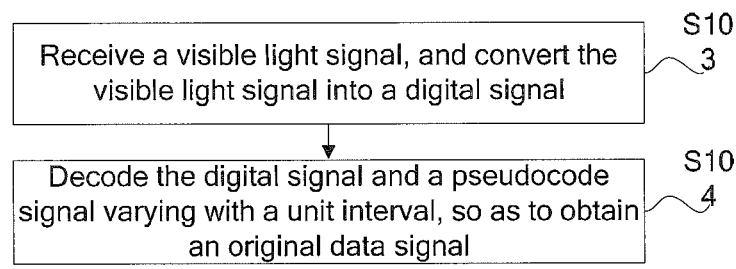
FIG. 2 is a flowchart of a decryption method based on visible light communication according to Embodiment 1.

Next referring to FIG. 2, FIG. 2 is a flowchart of a decryption method based on visible light communication according to Embodiment 1. The decryption method in FIG. 2 corresponds to the foregoing described encryption method in FIG. 1. The decryption method may include:

S103: A receive end receives a visible light signal sent by the transmit end, and converts the visible light signal into a digital signal. For example, for high-frequency flashes generated by an LED light, presence of light may indicate 1, and absence of light may indicate 0, or vice verse; therefore the received visible light signal can be converted into the digital signal.

S104: The receive end performs decoding (for example, a logical operation) on the digital signal and a second pseudocode signal, so as to obtain an original data signal.

Specifically, referring to the foregoing provided example, in the T1 unit interval, the received signal is 00101100101011110010, the second pseudocode signal is 11101001110100110100, and a code pattern, and start and end phases of the second pseudocode signal are the same as those of the first pseudocode signal in table 1. A logical operation, for example an "exclusive or" process, performed by the receive end on the received signal and the second pseudocode signal is shown in table 3:

TABLE 3

| Decoding process in a T1 unit interval | | | | | | | | | | | | | | | | | | | | |
|---|---|---|---|---|---|---|---|---|---|---|---|---|---|---|---|---|---|---|---|---|
| Received signal | 0 | 0 | 1 | 0 | 1 | 1 | 0 | 0 | 1 | 0 | 1 | 0 | 1 | 0 | 1 | 1 | 1 | 0 | 0 | 1 | 0 |
| Second pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 |
| Signal output after decoding | 1 | 1 | 0 | 0 | 0 | 1 | 0 | 1 | 0 | 1 | 1 | 1 | 1 | 0 | 0 | 0 | 0 | 1 | 1 | 0 |

It can be seen from table 3 that, a signal output after decoding is 11000101011110000110, and is the same as the original data signal in table 1, that is, the original data signal is obtained by decoding.

Because the second pseudocode signal also varies with a unit interval, after a period of time, assuming a T2 interval, in the T2 interval, a signal received by the receive end is the scrambling code signal in table 2, namely, 01001000011001010000; at this time, the second pseudocode signal is the same as the first pseudocode signal in table 2, namely 100011010100101010110, and then a decoding process is shown in table 4:

TABLE 4

Decoding process in a T2 unit interval

| Received signal | 0 | 1 | 0 | 0 | 1 | 0 | 0 | 0 | 0 | 0 | 1 | 1 | 0 | 0 | 1 | 0 | 1 | 0 | 0 | 0 | 0 |
|---|---|---|---|---|---|---|---|---|---|---|---|---|---|---|---|---|---|---|---|---|---|
| Second pseudocode signal | 1 | 0 | 0 | 0 | 1 | 1 | 0 | 1 | 0 | 1 | 0 | 0 | 1 | 0 | 1 | 0 | 1 | 0 | 1 | 1 | 0 |
| Signal output after decoding | 1 | 1 | 0 | 0 | 0 | 1 | 0 | 1 | 0 | 1 | 1 | 1 | 1 | 0 | 0 | 0 | 0 | 0 | 1 | 1 | 0 |

It can be seen from table 4 that, a signal output after decoding is 110001010111100000110, and is the same as the original data signal in table 2, that is, the original data is obtained by decoding.

Figure 3:
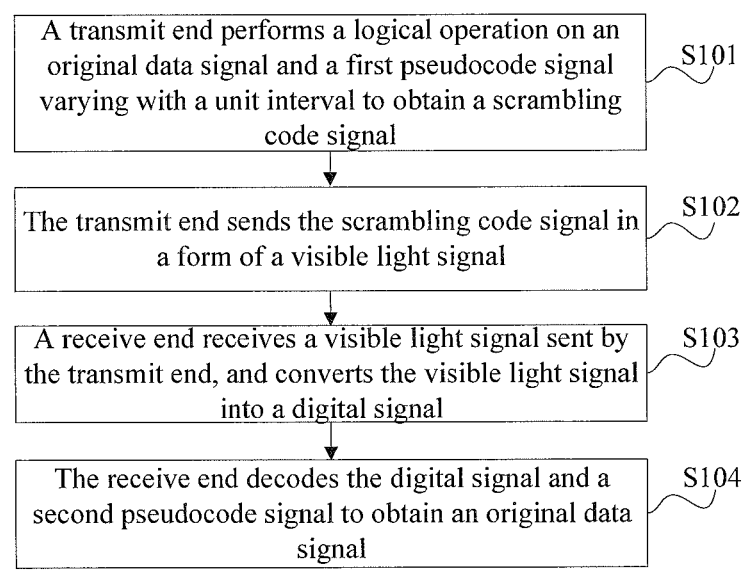
FIG. 3 is a flowchart of an encryption and decryption method based on visible light communication according to Embodiment 1.

FIG. 3 is a flowchart of an encryption and decryption method based on visible light communication according to Embodiment 1. The encryption and decryption method is referred to the foregoing described encryption method in FIG. 1 and the decryption method in FIG. 2, which is not described in detail for purpose of brevity.

Those skilled in the art can understand that, because a pseudocode signal (for example, a first pseudocode signal, and a second pseudocode signal) varies with a unit interval, in different unit intervals, a transmit end may generate a different scrambling code signal according to an original data signal and a different pseudocode signal, and the scrambling code signal may be decoded by a receive end by using a corresponding pseudocode signal. If a scrambling code signal in any unit interval is replicated and is resent and re-received in another unit interval, because the pseudocode signal at the receive end has changed, the scrambling code signal cannot be successfully decoded by the receive end.

For example, assume that in a T1 unit interval, a visible light signal sent by the transmit end, namely, a scrambling code signal 001011001010101110010, is captured by a high-speed camera, and the signal is replicated. After a unit interval, assume that a T2 unit interval is reached, when the replicated signal is used to attempt to control a device at the receive end, because a second pseudocode signal is changed to 100011010100101010110, decoding of the replicated signal is shown in table 5:

however, in an actual implementation process, another arithmetical operation and/or logical operation may be included, for example, addition, subtraction, multiplication, division, logical and, logical or, logical exclusive or, or the like, or a combination of two or more of the foregoing operations.

In addition, an encryption process of a transmit end and a decryption process of a receive end are corresponding to each other and/or mutually inverse. For example, if a logical operation adopted in step S101 is multiplication, a decoding operation adopted in step S104 is division; or if a logical operation adopted in step S101 is addition, a decoding operation adopted in step S104 is subtraction.

In Embodiment 1, because a visible light signal received by a receive end is different from an original data signal, a logical operation is performed on the original data signal and a first pseudocode signal to obtain a scrambling code signal, and because a pseudocode code signal varies with a unit interval, the scrambling code signal also varies with a unit interval. Even though the visible light sent is captured at a certain moment, a replicated signal cannot be recognized by the receive end and a device cannot be controlled because a visible light signal in a next time interval is different from that in a previous time interval, thereby improving security of the photonic Internet of Things.

Embodiment 2

Figure 4:
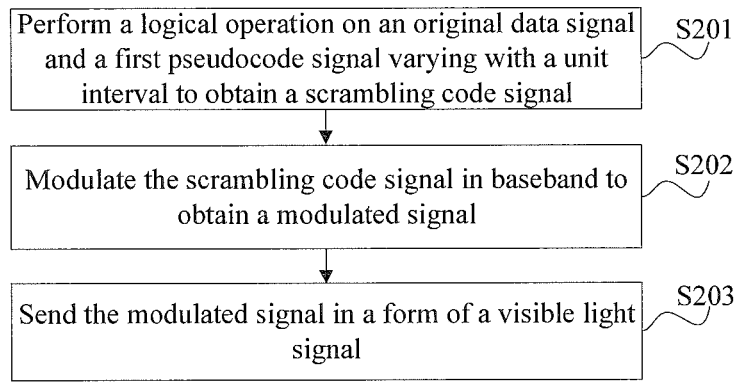
FIG. 4 is a flowchart of an encryption method based on visible light communication according to Embodiment 2.

Referring to FIG. 4, FIG. 4 is a flowchart of an encryption method based on visible light communication according to Embodiment 2, and the encryption method may include:

S201: A transmit end performs a logical operation on an original data signal and a first pseudocode signal varying with a unit interval to obtain a scrambling code signal.

TABLE 5

Decoding process of a replicated signal in a T2 unit interval

| Replicated signal | 0 | 0 | 1 | 0 | 1 | 1 | 0 | 0 | 1 | 0 | 1 | 0 | 1 | 0 | 1 | 1 | 1 | 0 | 0 | 1 | 0 |
|---|---|---|---|---|---|---|---|---|---|---|---|---|---|---|---|---|---|---|---|---|---|
| Second pseudocode signal | 1 | 0 | 0 | 0 | 1 | 1 | 0 | 1 | 0 | 1 | 0 | 0 | 1 | 0 | 1 | 0 | 1 | 0 | 1 | 1 | 0 |
| Signal output after decoding | 1 | 0 | 1 | 0 | 0 | 0 | 0 | 1 | 1 | 1 | 1 | 0 | 0 | 0 | 0 | 1 | 0 | 0 | 1 | 0 | 0 |

It can be seen from table 5 that, a signal output after decoding is attempted on the replicated signal in the T2 unit interval is 101000011110000100100, and is different from the original data signal 110001010111100000110 in table 1, that is, this type of replicated signal cannot be recognized by the receive end, and a device cannot be controlled, thereby improving security.

In Embodiment 1, an encryption, decryption, and encryption and decryption mode in the photonic Internet of Things is described. In this implementation, a step of performing a logical operation on an original data signal and a first pseudocode signal and a step of performing a logical operation on a received signal and a second pseudocode signal are described by using an exclusive or operation as an example;

As described above, the original data signal may be information to be sent, and may be a digital sequence signal; and the first pseudocode signal may be a digital sequence varying with a unit interval.

A frequency of the original data signal and a frequency of the first pseudocode signal are the same or in an integer multiple relationship; and a start phase of the original data signal is the same as that of the first pseudocode signal. The logical operation performed on the original data signal and the first pseudocode signal may be an arithmetical operation, for example addition, subtraction, multiplication, division, or the like, or may be another logical operation, for example logical and, logical or, logical exclusive or, or the like, or may be a combination of two or more of the foregoing operations.

For example, original data may be a control signal or two-dimensional code information content, and a digital sequence of the original data remains unchanged constantly, that is, the original data signal is 11000101011110000110 all the time. In a T1 unit interval, assuming that the first pseudocode signal is 11101001110100110100, a logical operation, for example an "exclusive or" process, on the original data signal and the first pseudocode signal is shown in table 1 in Embodiment 1:

It can be seen from table 1 that, the scrambling code signal output after the logical operation is 00101100101010111010, and is different from the original data signal, thereby playing a role of encrypting the original data.

After a preset interval, assuming that the interval is T2 at that time, because the first pseudocode signal varies with a unit interval, therefore in the T2 interval, assuming that the first pseudocode signal is changed to 10001101010010101010110, and the original data signal remains unchanged constantly, then a logical operation, for example an "exclusive or" process, on the original data signal and the first pseudocode signal is shown in table 2 in Embodiment 1:

It can be seen from table 2 that, the scrambling code signal output after the logical operation in the T2 interval is 01001000001100101010000, is also different from the original data signal, and is also different from the scrambling code signal in the T1 interval.

In an example, a first pseudocode signal may be a number, and an original data signal and the number may be multiplied, so as to obtain a scrambling code signal. In the T1 unit interval, assuming that the number is 20110405, after a multiplication operation, an obtained scrambling code signal is different from an original data signal, playing a role of encrypting the original data. After a preset interval, assuming that the interval is T2 at that time, because the number varies with a unit interval, therefore in the T2 interval, assuming that the number is changed to 20110406, and the original data signal remains unchanged constantly, the scrambling code signal output after a multiplication operation is also different from the original data signal, and is also different from the scrambling code signal in the T1 unit interval.

In addition, the encryption method further includes:

S202: The transmit end modulates the scrambling code signal in baseband to obtain a modulated signal.

S203: The transmit end sends the modulated signal in a form of a visible light signal. For example, the transmit end sends the modulated signal by means of LED light in a flashing manner.

Figure 5:
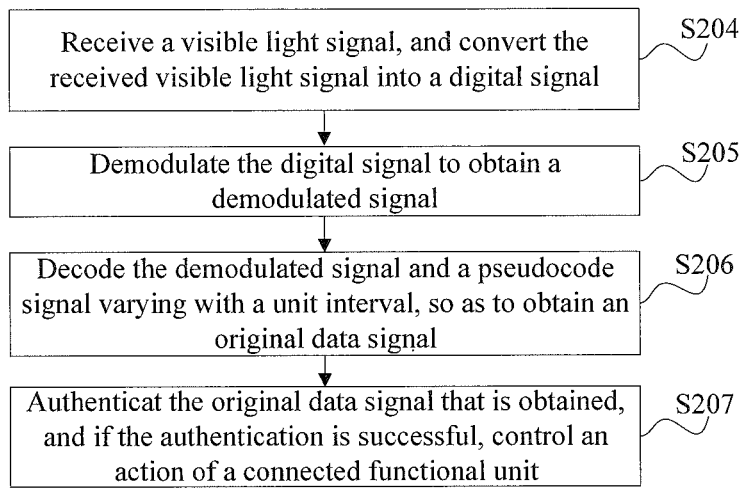
FIG. 5 is a flowchart of a decryption method based on visible light communication according to Embodiment 2.

Next referring to FIG. 5, FIG. 5 is a flowchart of a decryption method based on visible light communication according to Embodiment 2. The decryption method in FIG. 2 corresponds to the foregoing described encryption method in FIG. 4. The decryption method may include:

S204: A receive end receives a visible light signal sent by a transmit end, and converts the visible light signal into a digital signal.

S205: The receive end demodulates the digital signal to obtain a demodulated signal.

S206: The receive end decodes the demodulated signal and a second pseudocode signal to obtain an original data signal.

Specifically, reference is made to the foregoing provided example, in the T1 unit interval, the demodulated signal is 00101100101010111010, the second pseudocode signal is 11101001110100110100, and a code pattern, and start and end phases of the second pseudocode signal are the same as those of the first pseudocode signal in table 1. Decoding, for example, an "exclusive or" process, of the demodulated signal and the second pseudocode signal is shown in table 6:

TABLE 6

| Decoding process in a T1 unit interval | | | | | | | | | | | | | | | | | | | | | |
|---|---|---|---|---|---|---|---|---|---|---|---|---|---|---|---|---|---|---|---|---|---|
| Demodulated signal | 0 | 0 | 1 | 0 | 1 | 1 | 0 | 0 | 1 | 0 | 1 | 0 | 1 | 0 | 1 | 1 | 1 | 0 | 0 | 1 | 0 |
| Second pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 |
| Signal output after decoding | 1 | 1 | 0 | 0 | 0 | 1 | 0 | 1 | 0 | 1 | 1 | 1 | 1 | 0 | 0 | 0 | 0 | 0 | 1 | 1 | 0 |

It can be seen from table 6 that, a signal output after decoding is 11000101011110000110, and is the same as the original data signal in table 1, that is, the original data signal is obtained by decoding.

Because the second pseudocode signal also varies with a unit interval, after a period of time, assuming a T2 interval, in the T2 interval, the demodulated signal is exactly the same as the scrambling code signal in table 2, that is, both are 01001000001100101010000; at this time, the second pseudocode signal is the same as the first pseudocode signal in table 2, namely 10001101010010101010110, and then decoding, for example, an "exclusive or" process, is shown in table 7:

TABLE 7

| Decoding process in a T2 unit interval | | | | | | | | | | | | | | | | | | | | | |
|---|---|---|---|---|---|---|---|---|---|---|---|---|---|---|---|---|---|---|---|---|---|
| Demodulated signal | 0 | 1 | 0 | 0 | 1 | 0 | 0 | 0 | 0 | 0 | 1 | 1 | 0 | 0 | 1 | 0 | 1 | 0 | 0 | 0 | 0 |
| Second pseudocode signal | 1 | 0 | 0 | 0 | 1 | 1 | 0 | 1 | 0 | 1 | 0 | 0 | 1 | 0 | 1 | 0 | 1 | 0 | 1 | 1 | 0 |
| Signal output after decoding | 1 | 1 | 0 | 0 | 0 | 1 | 0 | 1 | 0 | 1 | 1 | 1 | 1 | 0 | 0 | 0 | 0 | 0 | 1 | 1 | 0 |

It can be seen from table 7 that, a signal output after decoding is 11000101011110000110, and is the same as the original data signal in table 2, that is, the original data is obtained by decoding.

Assume that in a T1 unit interval, a visible light signal sent by the transmit end, namely, a scrambling code signal 00101100101010111010, is captured by a high-speed camera, and the signal is replicated. After a unit interval, assume that a T2 unit interval is reached, when the replicated signal is used to attempt to control a device at the receive end, because a second pseudocode signal is changed to 10001101010010101010110, a process of decoding the replicated signal is shown in table 5.

It can be seen from table 5 that, a signal output after decoding is attempted on the replicated signal in the T2 unit interval is 101000011110000100100, and is different from the original data signal 110001010111100000110 in table 1, that is, this type of replicated signal cannot be recognized by the receive end, and a device cannot be controlled, thereby improving security.

In an example, in the T1 unit interval, a received light signal is adopted, that is, the scrambling code signal obtained in S201 is divided by the second pseudocode signal 20110405, and an original data signal is obtained by decoding. Because the number varies with a unit interval, therefore after a preset interval, assuming a T2 interval, in the T2 interval, the received light signal is adopted, that is, the scrambling code signal obtained in S201 is divided by the second pseudocode signal 20110406, and the original data signal is obtained by decoding. In this embodiment, a logical operation is described by using multiplication as an example, and a decoding operation is described by using division as an example. In an actual implementation process, addition may be used in the logical operation, and subtraction may be used in the decoding operation; or addition is used in the logical operation in 3 days, and multiplication is used in the decoding operation in the next 3 days. The receive end uses an operation manner corresponding to that used by the transmit end, which is not listed repeatedly herein.

S207: The receive end authenticates the original data signal that is obtained, and if the authentication is successful, controls an action of a functional unit connected to the receive end. For example, the receive end controls a door access system to implement an unlocking action.

Figure 6:
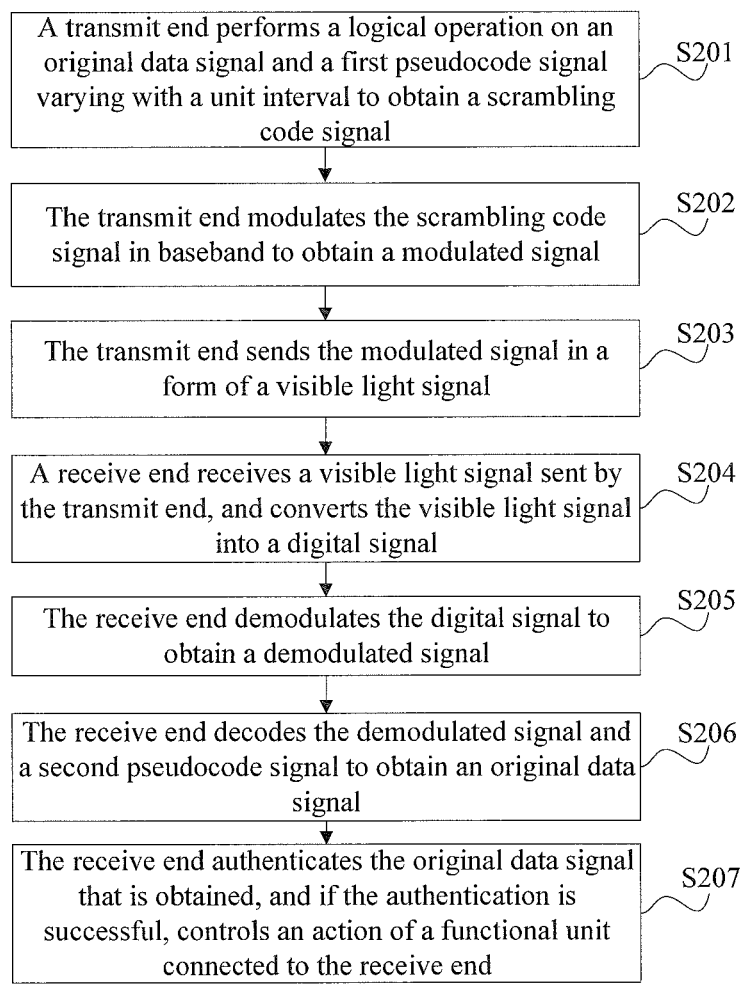
FIG. 6 is a flowchart of an encryption and decryption method based on visible light communication according to Embodiment 2.

FIG. 6 is a flowchart of an encryption and decryption method based on visible light communication according to Embodiment 2. The encryption and decryption method is referred to the foregoing described encryption method in FIG. 4 and the decryption method in FIG. 5, which is not described in detail for purpose of brevity.

It can be seen from the foregoing method embodiment that, the visible light signal transmitted between the transmit end and the receive end is an encrypted scrambling code signal, and the scrambling code signal varies with a unit interval and is unlikely to be cracked, thereby improving security of the photonic Internet of Things.

The foregoing describes the method embodiments of the present invention, and the following describes a hardware system running the foregoing method embodiments by listing embodiments, where the hardware system may be a dedicated photon client, a mobile phone, and a handheld electronic device having a function of emitting visible light.

Embodiment 3

Figure 7:
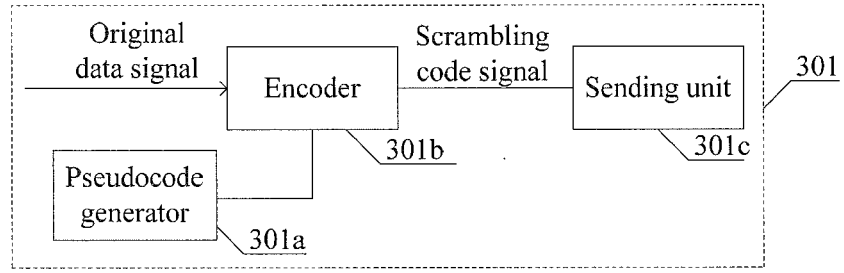
FIG. 7 is a schematic structural diagram of an encryption system based on visible light communication according to Embodiment 3.

Referring to FIG. 7, FIG. 7 is a schematic structural diagram of an encryption system based on visible light communication according to Embodiment 3, for example, a transmit end 301.

The transmit end 301 includes: a first pseudocode generator 301a, configured to generate and output a first pseudocode signal, where a working state of the pseudocode generator varies with a unit interval and the first pseudocode signal output also varies with a unit interval, for example, the first pseudocode signal output in a T1 unit interval, is 111010011101001110100, and the first pseudocode signal output in a T2 unit interval is 100011010100101010110; an encoder 301b, connected to the pseudocode generator 301a and configured to perform a logical operation on an original data signal and the pseudocode signal output by the pseudocode generator, so as to output a scrambling code signal, where the encoder 301b may also be a frequency mixer; and a sending unit 301c, connected to the encoder 301b and configured to send the scrambling code signal output by the encoder 301b in a form of a visible light signal; where the sending unit 301c may be a light-emitting diode, or may be another component having a function of light emission.

The transmit end 301 may be a dedicated photon client, a mobile phone, and a handheld electronic device having a function of emitting visible light. The encoder 301b and the sending unit 301c may be functional units of a chip at the transmit end 301.

Figure 8:
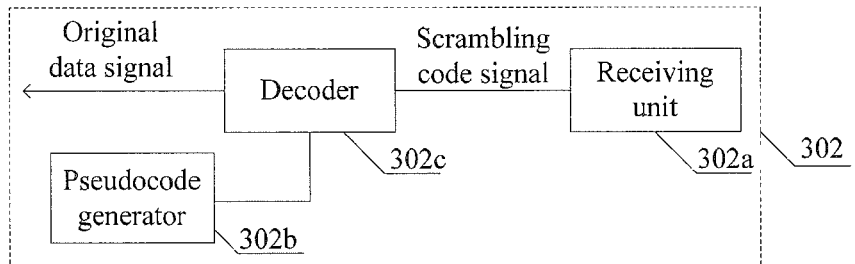
FIG. 8 is a schematic structural diagram of a decryption system based on visible light communication according to Embodiment 3.

Referring to FIG. 8, FIG. 8 is a schematic structural diagram of a decryption system based on visible light communication according to Embodiment 3, for example, a receive end 302.

The receive end 302 includes: a receiving unit 302a, configured to receive a visible light signal sent by the transmit end 301 and convert the visible light signal into a digital signal; and a second pseudocode generator 302b, configured to generate and output a second pseudocode signal, where the second pseudocode generator 302b and the first pseudocode generator 301a have a same structure, a same working frequency, and a same working state, and a code pattern, and start and end phases of output by the second pseudocode generator 302b are the same as those of the first pseudocode signal output by the first pseudocode generator 301a. The receive end 302 further includes a decoder 302c, connected to the receiving unit 302a and the second pseudocode generator 302b, and configured to decode the signal output by the receiving unit 302a and the pseudocode signal, so as to output an original data signal. The decoder 302c may be a frequency mixer.

It can be understood that the receive end 302 and the decoder 302b may be functional units of a chip at the receive end 302.

Figure 9:
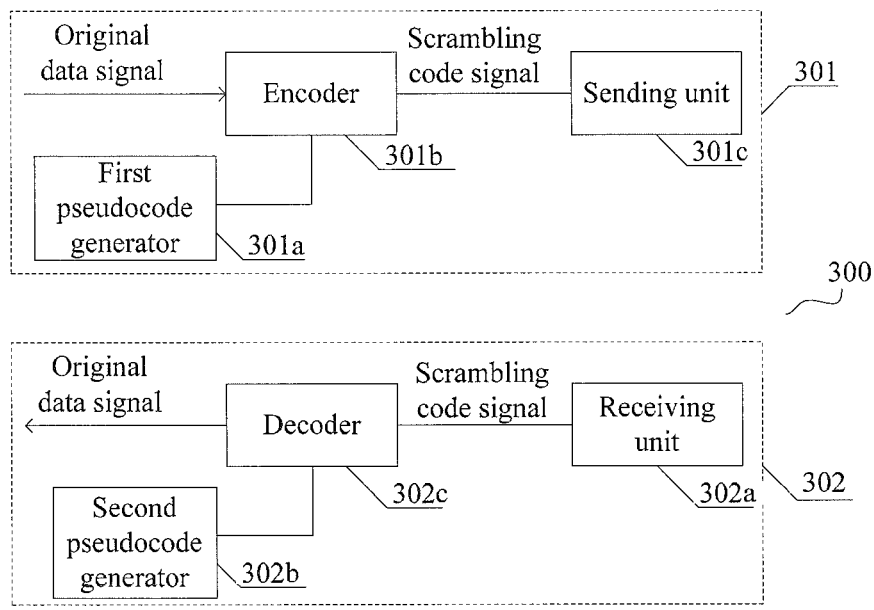
FIG. 9 is a schematic structural diagram of an encryption and decryption system based on visible light communication according to Embodiment 3.

Referring to FIG. 9, FIG. 9 is a schematic structural diagram of an encryption and decryption system based on visible light communication according to Embodiment 3, and the encryption and decryption system 300 includes the transmit end 301 described in FIG. 7 and the receive end 302 described in FIG. 8. For brevity, a structure of FIG. 9 is not further described herein.

Embodiment 4

Figure 10:
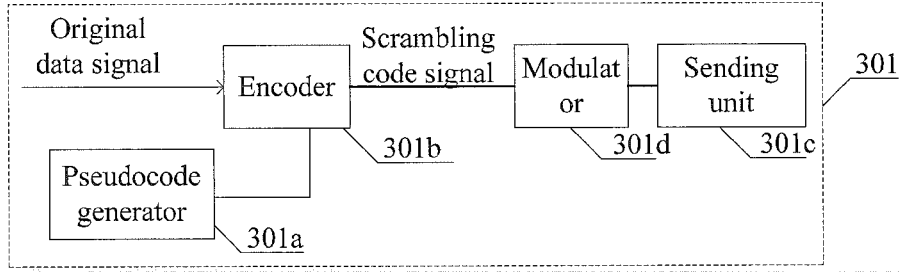
FIG. 10 is a schematic structural diagram of an encryption system based on visible light communication according to Embodiment 4.

Referring to FIG. 10, FIG. 10 is a schematic structural diagram of an encryption system based on visible light communication according to Embodiment 4, and compared with FIG. 7, the transmit end 301 further includes:

a modulator 301d, connected between an encoder 301b and a sending unit 301c and configured to modulate a scrambling code signal.

Figure 11:
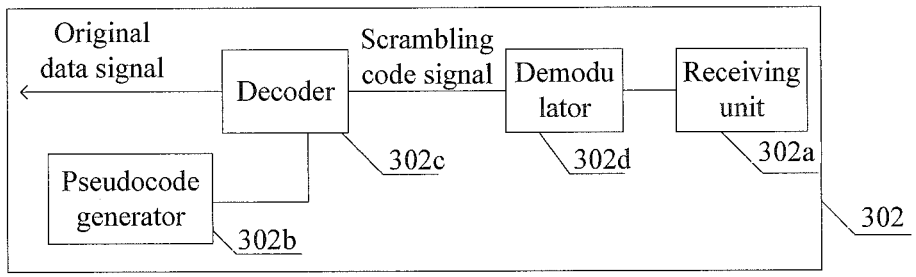
FIG. 11 is a schematic structural diagram of a decryption system based on visible light communication according to Embodiment 4.

Referring to FIG. 11, FIG. 11 is a schematic structural diagram of a decryption system based on visible light communication according to Embodiment 4, and compared with FIG. 8, the receive end 302 further includes:

a demodulator 302d, connected between a receiving unit 302a and a decoder 302c and configured to demodulate a digital signal output by a receiving unit 302a.

Figure 12:
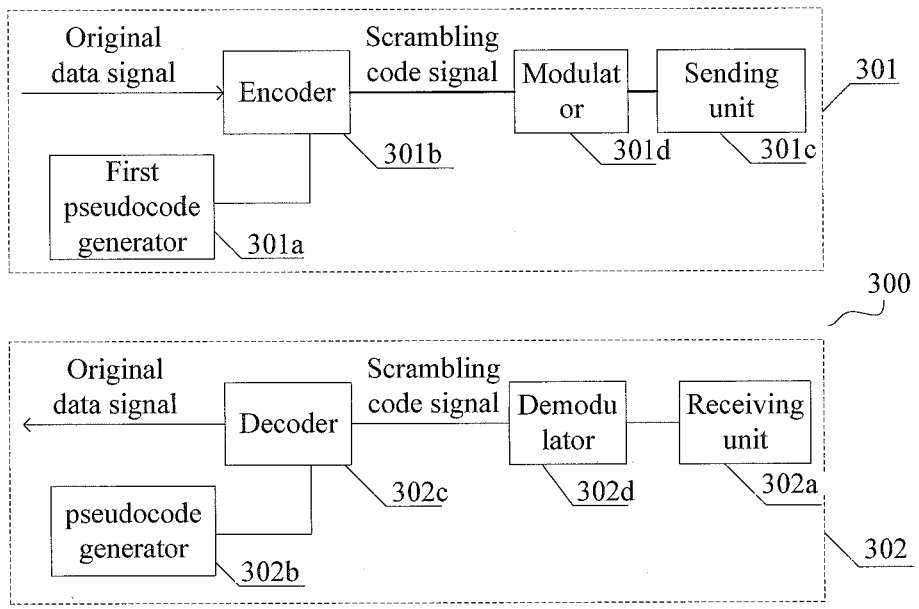
FIG. 12 is a schematic structural diagram of an encryption and decryption system based on visible light communication according to Embodiment 4.

Referring to FIG. 12, FIG. 12 is a schematic structural diagram of an encryption and decryption system based on visible light communication according to Embodiment 4, and the encryption and decryption system 300 includes the transmit end 301 described in FIG. 10 and the receive end 302 described in FIG. 11. For brevity, a structure of FIG. 12 is not further described herein.

In a specific implementation process, the encryption and decryption system 300 further includes a functional unit connected to a receiving unit 302, for example an electric lock.

Embodiment 5

Figure 13:
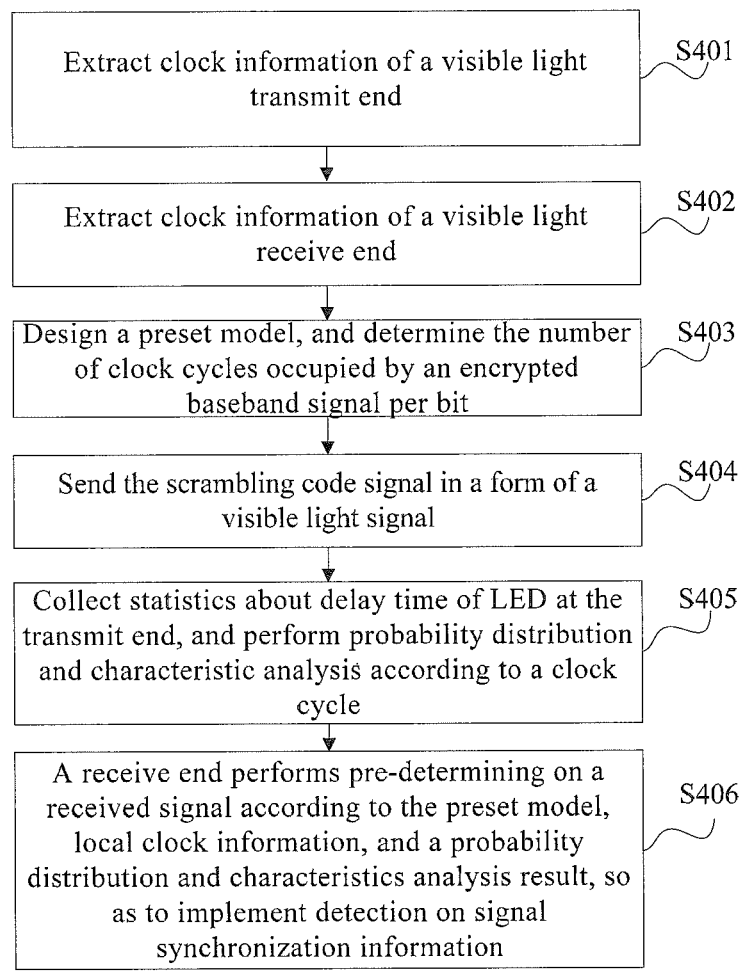
FIG. 13 is a flowchart of a clock synchronization method based on visible light communication according to Embodiment 5.

Referring to FIG. 13, FIG. 13 is a flowchart of a clock synchronization method based on visible light communication according to Embodiment 5.

S401: Extract clock information of a terminal, namely, a visible light transmit end. That is, extract each clock cycle t1 of an interior clock module of the visible light transmit end.

S402: Extract clock information of a network terminal, namely, a visible light receive end. That is, extract each clock cycle t2 of an interior clock module of the visible light receive end.

S403: Design a preset model, and determine the number of clock cycles occupied by an encrypted baseband signal per bit.

Since clock accuracy at a receive end is inconsistent with that at a transmit end, in addition since visible light communication is unidirectional, that is, the receive end cannot feed back to the transmit end, a preset model need to be designed, that is, determining is performed by using a preset value, so as to solve a problem of a synchronization failure caused due to clock accuracy inconsistency. Herein, assuming that a clock cycle t1 is 10 us, duration of an encrypted baseband signal per bit is T1, and when duration of the encrypted baseband signal per bit is 5 ms, T1=500*t1 is obtained. Similarly, T2=500*t2 may be obtained. Herein, due to clock accuracy, t1 may not be totally equal to t2, that is, there exists a certain error. Herein, assuming that total lengths of all transmitted different baseband data are the same, and first digit is fixed to a binary digit "1". That is, the total number of bits is a determined value, and therefore, a total transmission time length of each different baseband data may be estimated.

S404: A baseband signal at the transmit end controls turning-on or -off of LED light by means of LED drive, so as to send information in a form of a visible light.

A former bit of a baseband signal is read. When the bit is a binary digit 1, an LED switch is turned on, and a duration of turning-on is T1, that is, maintaining for 500*t1; if the bit is a binary digit 0, the LED switch is turned off, and a duration of turning-off is T1, that is, maintaining for 500*t1; and then a second bit is read, and processing is performed according to the method of reading the first bit.

S405: Collect statistics about delay time of LED at the transmit end, and perform probability distribution and characteristic analysis according to a clock cycle.

Since turning-on delay time of an LED light is inconsistent with turning-off time of an LED light, and time periods are random, causing inconsistency in gaps between stroboscopic signals output by a transmit end, and synchronization information may be lost even through an correct clock signal is added to the baseband signal to control turning-on and -off of an LED light. Specifically, a duration of each bit may be greater than 500*t1, or less than 500*t1, and may be 501*t1, 502*t1, or 499*t1. Probability distribution is measured by using an instrument to analyze a specific clock cycle occupied by each bit of various baseband signals, so as to find out which percentage of total clock cycles of most bits is the highest.

S406: A receive end performs pre-determining on a received signal according to the preset model, local clock information, and a probability distribution and characteristics analysis result, so as to implement detection on signal synchronization information.

The receive end may synchronize signal time according to a received stroboscopic signal for recording, and according to the preset model and distribution situation of probability statistics, so as to compare local time information of the receive end, estimate an error between clocks of a transmit end and the receive end, and correct a preset value of a preset model. For example, in a T2 cycle, if a light signal is received, and a duration T1 of a visible light is close to T2 or in an error of ±20% with T2, the visible light is determined as a binary digit "1"; if a duration T1 of continuity of no visible light is close to T2 or in an error of ±20% with T2, the visible light is determined as a binary digit "0". In next T2 cycle, determining is performed according to a same method of where a light signal is received in the previous T2 cycle. After detection is complete according to preset total time length in a preset module, synchronized detection of data is completed, total receiving of signals are implemented, and genuine data is obtained after decryption by using an operation.

The forgoing describes the embodiments of the present invention in detail. Specific examples are used in the specification to describe the principle and implementation manners of the present invention. The descriptions of the foregoing embodiments are merely intended to help understand the method and core idea of the present invention. In addition, with respect to the specific implementation manners and the application scope, modifications may be made by a person of ordinary skill in the art according to the idea of the present invention. Therefore, content of this specification shall not be construed as a limitation on the present invention.

What is claimed is:

1. An encryption method performed by a visible light communication device, comprising:
    extracting clock information of a LED transmitter device:
        combining the clock information with a dynamic encryption algorithm to obtain a pseudocode signal that varies with a unit interval;
    performing a logical operation on an original data signal for transmission from the LED transmitter device to a LED receiver device and the pseudocode signal to obtain a scrambling code signal, wherein the original data signal, the pseudocode signal, and the scrambling code signal are binary bit sequences, and wherein a start phase of the original data signal is the same as that of the pseudocode signal; and
    sending, to the LED receiver device, the scrambling code signal in a form of a visible light signal with a LED by turning on/off the LED according to each bit value of the scrambling code signal.

2. The encryption method according to claim 1, before the sending the scrambling code signal in a form of a visible light signal, further comprising:
    modulating the scrambling code signal.

3. The encryption method according to claim 1, wherein a frequency of the original data signal and a frequency of the pseudocode signal are the same or in an integer multiple relationship.

4. The encryption method according to any one of claim 1, 2, or 3, wherein the pseudocode signal is a number, and the logical operation comprises addition, subtraction, multiplication, division, logical and, logical or, logical exclusive or, or a combination of the forgoing two or more of the original data signal and the number; and wherein the number is: a date varying with time, a prime number varying with time, an odd number varying with time, or an even number varying with time.

5. A visible light communication device, comprising:
a pseudocode generator, configured to extract clock information of a transmitter device, combine the clock information with a dynamic encryption algorithm to generate and output a pseudocode signal, wherein the pseudocode signal varies with a unit interval;
an encoder, connected to the pseudocode generator and configured to perform a logical operation on an original data signal for transmission from the LED transmitter device to a LED receiver device and the pseudocode signal output by the pseudocode generator, so as to output a scrambling code signal, wherein the original data signal, the pseudocode signal, and the scrambling code signal are binary bit sequences, and wherein a start phase of the original data signal is the same as that of the pseudocode signal; and
a sending unit connected to the encoder and comprising a LED configured to send, to the LED receiver device, the scrambling code signal in a form of a visible light signal by turning on/off the LED according to each bit value of the scrambling code signal.

6. The encryption system according to claim 5, further comprising:
a modulator, connected between the encoder and the sending unit, and configured to modulate the scrambling code signal.

7. The encryption system according to claim 5 or 6, wherein the pseudocode signal is a number, and the logical operation comprises addition, subtraction, multiplication, division, logical and, logical or, logical exclusive or, or a combination of the forgoing two or more of the original data signal and the number; and
wherein the number is: a date varying with time, a prime number varying with time, an odd number varying with time, or an even number varying with time.

8. A decryption method performed by a LED receiver device, comprising:
receiving a visible light signal sent by a LED at a LED transmitter device by turning on/off the LED according to each bit value of a scrambled signal, and converting the visible light signal into a digital signal;
extracting local clock information;
combining the clock information with a dynamic encryption algorithm to obtain a pseudocode signal that varies with a unit interval; and
decoding the digital signal with the pseudocode signal, so as to obtain an original data signal, wherein the digital signal, the original data signal, and the pseudocode signal are binary bit sequences, wherein a start phase of the original data signal is the same as that of the pseudocode signal; wherein
a code pattern and a start phase of the pseudocode signal are the same as those of a pseudocode signal of the LED transmitter device at a same time point.

9. The decryption method according to claim 8, wherein before the method, the following are comprised: designing a preset model, and determining the number of clock cycles occupied by the digital signal per bit; and
wherein the decryption method further comprises:
collecting statistics about delay time at the LED transmitter device; and performing probability distribution and characteristic analysis according to the clock cycle; and
performing pre-determining on a received signal according to the preset model, the local clock information, and a probability distribution and characteristics analysis result, so as to implement detection on signal synchronization information.

10. The decryption method according to claim 8, before the decoding the digital signal and a pseudocode signal varying with a unit interval, the decryption method further comprising:
demodulating the digital signal.

11. The decryption method according to claim 8, further comprising:
authenticating the original data signal that is obtained, and if the authentication is successful, controlling an action of a connected functional unit.

12. The decryption method according to claim 8, wherein a frequency of the original data signal and a frequency of the pseudocode signal are the same or in an integer multiple relationship.

13. The decryption method according to any one of claim 8, 9, or 10-12, wherein the pseudocode signal is a number, and the decoding comprises addition, subtraction, multiplication, division, logical and, logical or, logical exclusive or, or a combination of the forgoing two or more of the number and the digital signal; and
wherein the number is: a date varying with time, a prime number varying with time, an odd number varying with time, or an even number varying with time.

14. A visible light communication device, comprising:
a LED receiver device, configured to receive a visible light signal sent by a LED at a LED transmitter device by turning on/off the LED according to each bit value of a scrambled signal and convert the visible light signal into a digital signal;
a pseudocode generator, configured to extract local clock information, combine the clock information with a dynamic encryption algorithm to generate and output a pseudocode signal varying with a unit interval; and
a decoder, connected to the receiving unit and the pseudocode generator, and configured to decode the digital signal with the pseudocode signal, so as to output pseudocode signal are binary bit sequences, wherein a start phase of the original data signal is the same as that of the pseudocode signal.

15. The decryption system according to claim 14, further comprising:
a demodulator, connected between the receiving unit and the decoder, and configured to demodulate the digital signal.

16. The decryption system according to claim 14, wherein the pseudocode generator and a pseudocode generator at the LED transmitter device have a same structure;
the pseudocode generator and a pseudocode generator at the LED transmitter device have a same working state; and
a frequency of the pseudocode generator and a frequency of a pseudocode generator at the LED transmitter device are the same or in an integer multiple relationship.

17. An encryption and decryption method performed by visible light communication devices, comprising:
extracting clock information of a LED transmitter device:
combining the clock information with a dynamic encryption algorithm to obtain a first pseudocode signal that varies with a unit interval;
performing, by the LED transmitter device, a logical operation on an original data signal for transmission from the LED transmitter device to a LED receiver device and the first pseudocode signal to obtain a scrambling code signal, wherein the original data signal, the first pseudocode signal, and the scrambling code signal are binary bit sequences, and sending, to the LED receiver device, the scrambling code signal in a form of a visible light signal with a LED by turning on/off the LED according to each bit value of the scrambling code signal, wherein a start phase of the original data signal is the same as that of the first pseudocode signal; and receiving, by a the LED receiver device, the visible light signal, converting the visible light signal into a digital signal, extracting local clock information, combining the clock information with a dynamic encryption algorithm to obtain a second pseudocode signal that varies with a unit interval, and decoding the digital signal and the second pseudocode signal, so as to obtain the original data signal; wherein a code pattern, and start and end phases of the second pseudocode signal are the same as those of the first pseudocode signal.

18. An encryption and decryption system of visible light communication devices, comprising a LED transmitter device and a LED receiver device, wherein the LED transmitter device comprises: a first pseudocode generator, configured to extract clock information of the LED transmitter device, combine the clock information with a dynamic encryption algorithm to generate and output a first pseudocode signal, wherein the pseudocode signal varies with a unit interval; an encoder, connected to the first pseudocode generator and configured to perform a logical operation on an original data signal for transmission from the LED transmitter device to the LED receiver device and a pseudocode signal output by a pseudocode generator, so as to output a scrambling code signal, wherein the original data signal, the pseudocode signal, and the scrambling code signal are binary bit sequences, and wherein a start phase of the original data signal is the same as that of the first pseudocode signal; and a sending unit, connected to the encoder and configured to send, to the LED receiver device, the scrambling code signal in a form of a visible light signal with a LED by turning on/off the LED according to each bit value of the scrambling code signal; and LED receiver device comprises: a receiving unit, configured to receive the visible light signal and convert the visible light signal into a digital signal; a second pseudocode generator, configured to extract local clock information, combine the clock information with a dynamic encryption algorithm to generate and output a second pseudocode signal, wherein a code pattern, and start and end phases of the second pseudocode signal are the same as those of the first pseudocode signal; and a decoder, connected to the receiving unit and the second pseudocode generator, and configured to decode the digital signal and the pseudocode signal, so as to output an original data signal.

* * * * *